United States Patent
Hannen et al.

(10) Patent No.: US 6,845,600 B2
(45) Date of Patent: Jan. 25, 2005

(54) METHOD OF WRAPPING AN OBJECT WITH AN ELASTIC FOIL

(75) Inventors: Reiner Hannen, Kalkar-Wissel (DE); Norbert Vermeulen, Kleve (DE)

(73) Assignee: Msk-Verpackungs-Systeme Gesellschaft mit Beschrankter Haftung, Kleve (DE)

( * ) Notice: Subject to any disclaimer, the term of this patent is extended or adjusted under 35 U.S.C. 154(b) by 0 days.

(21) Appl. No.: 10/258,834

(22) PCT Filed: Apr. 27, 2001

(86) PCT No.: PCT/EP01/04756
§ 371 (c)(1),
(2), (4) Date: Feb. 12, 2003

(87) PCT Pub. No.: WO01/83301
PCT Pub. Date: Nov. 8, 2001

(65) Prior Publication Data
US 2003/0154693 A1 Aug. 21, 2003

(30) Foreign Application Priority Data
Apr. 28, 2000 (DE) .......................... 100 20 856

(51) Int. Cl.⁷ ................................. B65B 9/10
(52) U.S. Cl. .............. 53/459; 53/441; 53/567
(58) Field of Search .......... 53/441, 459, 567, 53/576

(56) References Cited

U.S. PATENT DOCUMENTS

| | | | |
|---|---|---|---|
| 3,925,964 A | * 12/1975 | Birkenfeld et al. | 53/567 |
| 4,050,219 A | * 9/1977 | Higgins | 53/567 |
| 4,473,990 A | * 10/1984 | Thimon | 53/567 |
| 6,298,636 B1 | * 10/2001 | Lachenmeier et al. | 53/442 |

FOREIGN PATENT DOCUMENTS

DE        31 01 310      12/1981

* cited by examiner

*Primary Examiner*—John Sipos
(74) *Attorney, Agent, or Firm*—Herbert Dubno; Andrew Wilford

(57) ABSTRACT

The invention relates to a method for wrapping unit loads or packaged goods (2) using a section of elastic film (8) that is at least approximately hood-shaped, whereby the section of film is gathered and pulled over the unit load or packaged goods. The invention aims to provide a significantly faster packaging method of this type, which can be used in branches of industry with high production figures, e.g. white goods (dishwashers, refrigerators etc.). To achieve this, the section of film is gathered by a gathering device (3), then taken by a covering device (6) that can be displaced separately and subsequently pulled over the unit load or packaged goods, in particular being stretched beforehand. Another section of film can be gathered by the gathering device, while the previous section of film is still being pulled over the unit load or packaged goods.

2 Claims, 1 Drawing Sheet

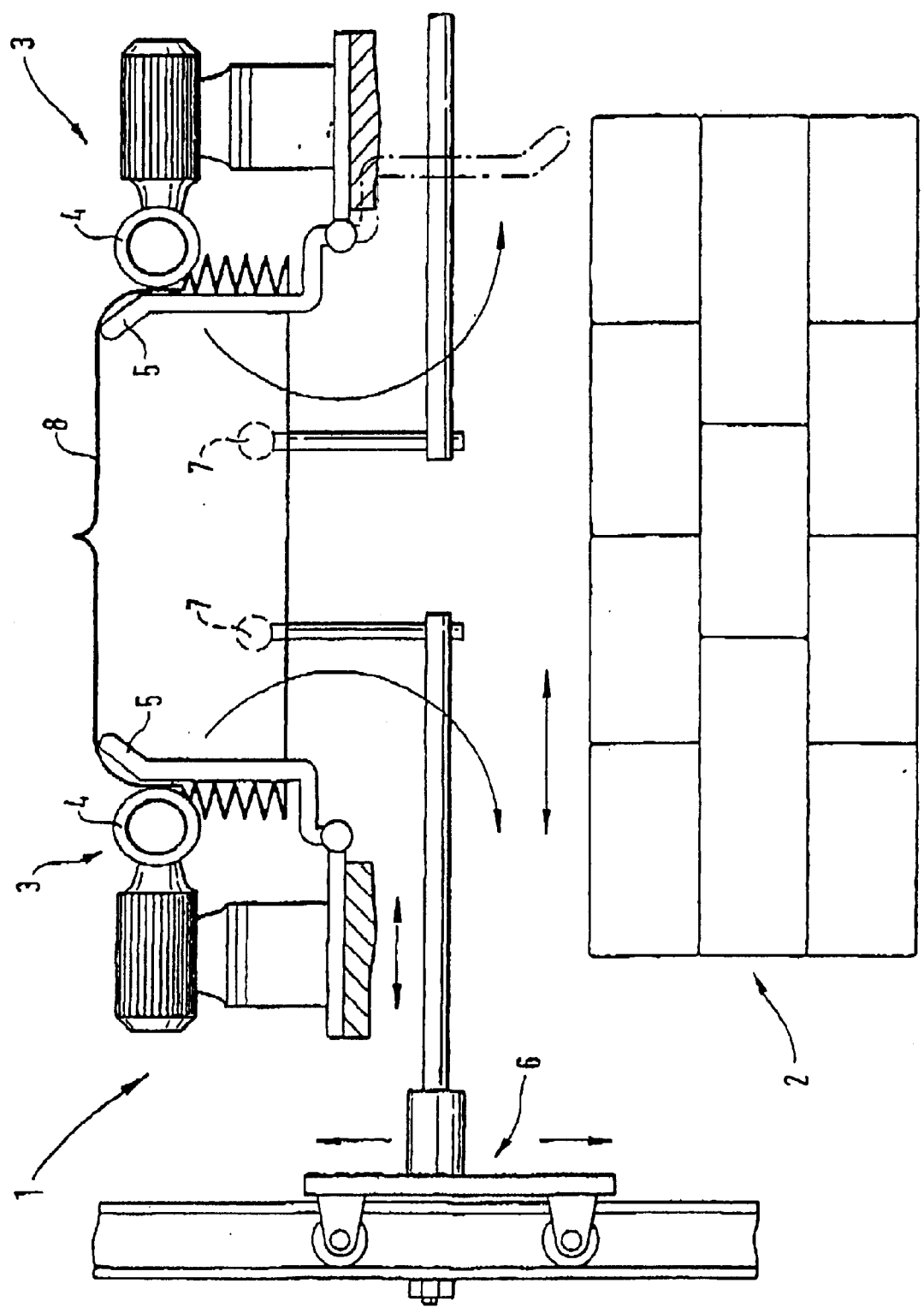

METHOD OF WRAPPING AN OBJECT WITH AN ELASTIC FOIL

The invention relates to a method of wrapping an object comprised of one or more pieces with at least one hood-shaped elastic foil, the foil being gathered and pulled down over the object comprised of one or more pieces.

In practice such methods are known whereby both the gathering and the pulling down of the foil over the object comprised of one or more pieces is done by a combined gathering and pulling device that manipulates the foil. To date such methods are mainly used in the chemical field where the packaging rate is relatively slow.

German 31 01 310 describes a method of pulling down the packing material as a hood formed of a section of a loop, control of the stacking of the folds during folding up being done by a fitting frame that drops while the folding frame itself remains stationary (column 13, lines 1–6). Thus the actual folding of the loop is completely taken care of by the folding device, the setting down and storing of the folds being the job of the fitting frame.

As soon as the fitting frame reaches its lowermost position, the folded-up material can be moved away, since the foil hood is no longer connected with the fitting frame.

The disadvantage of this is that the folds can only be started by the folding device when the fitting frame has not reached its upper position at the folding device, that is for example during movement away of the previously folded material or stack of material the folding operation is limited since the fitting frame that takes over the folded loop section is not yet available.

As a result this machine is much slower than standard machines of the known type.

A further disadvantage is that with the standard method of the prior art the foil hood is produced mainly in the machine itself by welding together of adjacent layers of a particularly foldable foil and as a result the weld seam is not fully cooled when later stretched or is not fully cured. As a result the seam has to be treated gently or a hole will be formed in it when stretched. The result is a weld seam of limited quality in the finished goods.

It is an object of the invention to provide a method of the above-described type that wraps much more rapidly and that can thus be used in industrial applications requiring high production speeds, e.g. in white-metal manufacture (washing machines, refrigerators, etc.). In addition the seam should be stronger.

This object is attained by a wrapping method for an object comprised of one or more pieces in at least one hood-shaped elastic foil which is gathered and then pulled over the object, the foil being gathered by a gathering device and then transferred to a separate movable pull-down device and thereafter is pulled over the object after being stretched, a further foil being gathered by the gathering device at the same time that the preceding foil is pulled over the object.

According to the invention the method can be used in a vertical or horizontal orientation.

Preferably a closable welding device is provided for welding at least one adjacent layer of the foldable foil at least in the region of corners to form the hood shape, so the hood-shaped foil has at its upper end regions that when pulled over the object catch on its upper edge and let the object be completely wrapped.

As a result of welding the foil hood while the preceding foil hood is being fitted to the object, the following just welded foil hood has more cooling time so that the weld seam is only stretched after being gathered in a distinctly cooled, in particular fully cooled and thus loadable condition.

In this manner the formation of holes formed by tension during stretching is largely or wholly eliminated and the quality of the weld seam of the finished packaging is of better quality.

According to the invention the gathering device has at least two diagonally opposite gathering wheels so that one is assured of a uniform gathering over the entire circumference of the foil.

Preferably the gathering device has pivotal holding elements that engage inside the foil as it is being gathered and that transfer it to the pull-down device so that transfer of the foil takes place through small and simple-to-control movements, pivotings, or the like.

According to a preferred embodiment of the invention, the pull-down device for transferring, pulling down and in particular stretching the foil has holders which are movable along the height of the one- or multiple-piece object as well as in a plane of its width and breadth and which are spreadable after fitting inside the gathered hood-shaped foil so that a single device serves both for stretching as well as pulling down the foil over the object.

An embodiment of the invention is described in the following with reference to a drawing. The sole FIGURE shows an apparatus 1 for wrapping a single- or multiple-piece object 2 and having a separate gathering device 2 with gathering wheels 4 and pivotal holding arms 5 and a pull-down device 6 separate from the gathering device 3, having holders 7, and movable along the object 2.

The holders 7 are movable both along the height of the object as well is in the plane of its width and depth.

In this manner a first foil 8 can be taken after gathering in the gathering device 3 by upward and outward movement of the holders 7 from the pull-down device 6, the holding arms 5 of the gathering device being cleared by downward movement of the foil 8.

Subsequently the first foil 8 is stretched after dropping of the holders 7 by spreading of the holders 7 in the plane of the one- or multiple-piece object and then is pulled down over the object 2, the upper end of the foil 8 being stopped on the upper end of the object 2 as a result of its hood shape.

The hood shape of the elastic foil 8 is produced in particular when the foil 8 is foldable by welding together adjacent layers of foils 8 at least in the corners. It is also possible to weld the foil 8 over its entire width or only at parts at the corners. In addition a premanufactured foil hood can be used as the foil 8.

During this a further foil 8 is gathered in the gathering device 3.

What is claim is:

1. A method of wrapping an object with an elastic foil, the method comprising the steps of sequentially:

a) making a weld in the foil to form the foil into the first hood and gathering the first hood of the foil over two movable arms spaced in a direction from the object while cooling the weld and without significant stretching of the first hood;

b) inserting a pair of holders in the direction into the first hood gathered on the arms after the weld has cooled;

c) spreading the holders transversely of the direction into engagement inside the first hood and moving the arms away from the first hood so as to stretch the first hood transversely of the direction sufficiently to fit over the object and to transfer the first hood from the arms to the holders;

d) displacing the transversely stretched first hood on the holders in the direction away from the arms;

e) pulling the transversely stretched first hood on the holders over the object while forming, cooling, and then gathering a second hood of the foil over the arms; and f) repeating steps b) through e) with the second hood, a third hood being formed and gathered over the arms while the second hood is being pulled over the object.

2. The object-wrapping method defined in claim 1 wherein the arms are pivotal.

* * * * *